(12) United States Patent
Fries et al.

(10) Patent No.: US 11,201,733 B2
(45) Date of Patent: Dec. 14, 2021

(54) METHOD AND DEVICE FOR TRANSFERRING DATA IN A TOPIC-BASED PUBLISH-SUBSCRIBE SYSTEM

(71) Applicant: Siemens Aktiengesellschaft, Munich (DE)

(72) Inventors: Steffen Fries, Baldham (DE); Rainer Falk, Poing (DE)

(73) Assignee: SIEMENS AKTIENGESELLSCHAFT

( * ) Notice: Subject to any disclaimer, the term of this patent is extended or adjusted under 35 U.S.C. 154(b) by 232 days.

(21) Appl. No.: 16/348,535

(22) PCT Filed: Sep. 15, 2017

(86) PCT No.: PCT/EP2017/073228
§ 371 (c)(1),
(2) Date: May 9, 2019

(87) PCT Pub. No.: WO2018/091167
PCT Pub. Date: May 24, 2018

(65) Prior Publication Data
US 2020/0059357 A1   Feb. 20, 2020

(30) Foreign Application Priority Data
Nov. 16, 2016   (DE) ................ 10 2016 222 523.5

(51) Int. Cl.
*H04L 9/08*   (2006.01)
*H04L 29/06*   (2006.01)

(52) U.S. Cl.
CPC .......... *H04L 9/0836* (2013.01); *H04L 9/0861* (2013.01); *H04L 63/065* (2013.01); *H04L 63/08* (2013.01)

(58) Field of Classification Search
CPC ... H04L 9/0861; H04L 9/0836; H04L 9/0833; H04L 63/065; H04L 63/08; H04L 2463/061; Y04S 40/20
(Continued)

(56) References Cited

U.S. PATENT DOCUMENTS 6,088,454 A * 7/2000 Nagashima ........... H04L 9/0836
380/277
6,195,751 B1 * 2/2001 Caronni ................ H04L 12/185
713/162
(Continued)

FOREIGN PATENT DOCUMENTS

| GN | 1921433 A | 2/2007 |
|---|---|---|
| WO | 2007123224 A1 | 11/2007 |
| WO | 2007149850 A2 | 12/2007 |

OTHER PUBLICATIONS

Request for Comments RFC 6407 Internet: https://www.rfc-editor.org/info/rfc6407 Oct. 2011.
(Continued)

*Primary Examiner* — Benjamin A Kaplan
(74) *Attorney, Agent, or Firm* — Schmeiser, Olsen & Watts LLP (57) ABSTRACT

Provided is a method for transferring data in a topic-based publish-subscribe system, including a key distribution server and a number of local client systems that can be coupled to the key distribution server, including: providing a group key by the key distribution server for a group selected from the local client systems, locally deriving a first-order sub-group key for a first-order subgroup of the group by key derivation parameters at least comprising the provided group key and a certain topic of the publish-subscribe system by means of the particular client system of the first-order sub-group, and transferring at least one message cryptographically protected by the derived first-order sub-group key between the
(Continued)

client systems of the first-order sub-group. Differentiation within group communication according to topic by specific cryptographic keys is thereby enabled.

14 Claims, 3 Drawing Sheets

(58) Field of Classification Search
USPC .......................................................... 713/155
See application file for complete search history.

(56) References Cited

U.S. PATENT DOCUMENTS

| | | |
|---|---|---|
| 6,363,154 B1 | 3/2002 | Peyravian et al. |
| 7,234,058 B1 | 6/2007 | Baugher et al. |
| 2005/0044356 A1 | 2/2005 | Srivastava et al. |
| 2012/0030572 A1 | 2/2012 | Karenos et al. |
| 2012/0144210 A1 | 6/2012 | Yacobi |
| 2012/0266209 A1 | 10/2012 | Gooding et al. |
| 2013/0083926 A1 | 4/2013 | Hughes et al. |
| 2013/0142336 A1 | 6/2013 | Fries et al. |
| 2013/0227273 A1 | 8/2013 | Di Crescenzo |
| 2014/0226821 A1 | 8/2014 | Kurdziel et al. |
| 2016/0330209 A1 | 11/2016 | Iacob et al. |
| 2018/0255146 A1* | 9/2018 | Aston .................. H04L 67/141 |

OTHER PUBLICATIONS

Request for Comments RFC4535 Internet: http://www.rfc-editor.org/rfc/rfc4535.txt Jun. 2006.
Standard IEC61850-8-2.
PCT International Search Report and Written Opinion of International Searching Authority dated Oct. 30, 2017 corresponding to PCT International Application No. PCT/EP2017/073228, filed Sep. 15, 2017.
DE Search Report dated Sep. 18, 2017 corresponding to DE Application No. 10 2016 222 523.5, filed Nov. 16, 2016.
Chinese Office Action for Application No. 201780071162.6, dated Mar. 2, 2021.

* cited by examiner

METHOD AND DEVICE FOR TRANSFERRING DATA IN A TOPIC-BASED PUBLISH-SUBSCRIBE SYSTEM

CROSS-REFERENCE TO RELATED APPLICATIONS

This application claims priority to PCT Application No. PCT/EP2017/073228, having a filing date of Sep. 15, 2017, which is based off of DE Application No. 10 2016 222 523.5, having a filing date of Nov. 16, 2016, the entire contents both of which are hereby incorporated by reference.

FIELD OF TECHNOLOGY

The following relates to a method for transferring data in a topic-based publish-subscribe system. Furthermore, embodiments of the present invention relates to a device for transferring data in a topic-based publish-subscribe system and to such a publish-subscribe system.

BACKGROUND

With the opening up of closed systems to open IoT systems (IoT; Internet-of-Things), new requirements are emerging for communication in industrial networks, which are known from the telecommunication field and the public internet. Due to the increasing decentralization of the systems, components are located behind firewall systems and are therefore not directly accessible from the internet.

Here, so-called publish-subscribe systems are used which support both the discovery phase, that is to say, the search for the communication partner, as well as the establishment of an end-to-end communication relationship. Publish-subscribe systems can also be referred to as publication and subscription systems. In publish-subscribe systems, the classical point-to-point communication is used alongside a group communication, in order to access a large number of systems in an efficient manner. An example of this is load shedding, or else the limitation of the power infeed in a Smart Grid system.

The end-to-end communication is subject to a requirement for end-to-end security. This applies both to the point-to-point communication and the group communication. There is therefore a demand, both in the internet and in IoT systems and industrial systems, to be able to provide end-to-end security for a publish-subscribe communication.

Publish-subscribe protocols are known, in which a central entity exists for the registration of nodes and performing address resolution. Example protocols are known from the telecommunications sector under names such as H.323 and SIP. In the industrial sector, the protocol OPC-UA is used and the protocol XMPP is integrated into the Smart Grid environment.

In the case of the XMPP protocol, which is currently used mainly for chat applications, the group communication takes place via so-called multi-user chatrooms (MUC). Access to the MUC is checked by the messaging server per node. XMPP supports authentication on the application layer by means of the SASL protocol. The authentication in this case takes place between the client and the server. End-to-end within the sense of the application is currently only supported by the use of S/MIME.

In addition, key derivations for pair-wise security relations are known, such as are used in protocols like TLS, for example. In addition, solutions are known for negotiation in messenger clients, to create a cryptographic context for protecting the communication.

Key derivation is performed by key derivation functions. Examples of these include HMAC-SHA256 and KDF2. Conventional derivation parameters that are used by such a key derivation function are the identifier of a node, a protocol version or a hop count, as in the case of 3GPP SAE.

In addition, for a commutative key derivation of a key based on the Diffie-Hellman problem, the Burmester-Desmedt conference-keying protocol can be used. In addition to the key negotiation for groups in decentralized systems, other key distribution mechanisms exist in systems with a central component. Examples of this are Group Domain of Interpretation (GDOI, defined in RFC 6407) and Group Security Association Management Protocol (GSAKMP, defined in RFC 4535).

These protocols typically involve a registration on a key distribution server, which distributes the group key to the nodes following their successful authentication and authorization.

SUMMARY

Against this background, an aspect relates to improve the transfer of data in a topic-based publish-subscribe system.

According to a first aspect, a method for transferring data in a topic-based publish-subscribe system is proposed, comprising a key distribution server and a number of local client systems that can be coupled to the key distribution server. The method comprises the following steps:

a) providing a group key by the key distribution server for a group selected from the local client systems, b) locally deriving a first-order sub-group key for a first-order sub-group of the group by means of key derivation parameters, at least comprising the provided group key and a specific topic of the publish-subscribe system for the respective client system of the first-order sub-group, and c) transferring at least one message cryptographically protected by means of the derived first-order sub-group key between the client systems of the first-order sub-group.

The group comprises a subset of the client systems coupled to the key distribution server. The respective first-order sub-group is formed from a subset of the client systems of the group.

The proposed approach enables a differentiation by topic within a group communication, such as issues or services, by means of specific cryptographic keys, here the first-order sub-group keys. In doing so, the key derivation can be implemented with respect to the specific topics from the group key without an additional secret. The group key can also be referred to as the basic group key. This means a message which has been potentially assigned to an incorrect topic can be detected at the recipient, the corresponding local client system, solely on the basis of a failed authentication of the message.

Another secret can also be used for the respective sub-group, hence it is also possible to enforce a protocol whereby only members of this sub-group with predefined group affiliations can send and receive.

As already explained above, the topic of the publish-subscribe system is, for example, an issue or a service of the publish-subscribe system. The topic can also be structured hierarchically, for example by means of a topic tree, for example topic 1, topic 2, topic 3. In this case, the key derivation can also be carried out iteratively according to the topic tree. In the example, this is carried out first for topic 1 as a derivation parameter, then with topic 2 as a derivation parameter and then with topic 3 as a derivation parameter.

A key distribution server can be arranged in the publish-subscribe system as a central key distribution server or be implemented on an intermediate node in the publish-subscribe system as a decentralized key distribution server. This therefore allows a hierarchical or cascaded system of key distribution servers to be implemented in the publish-subscribe system. The central key distribution server can supply the group key to the nodes of the group, in other words the client systems of the group. A decentralized key distribution server, in other words an intermediate node which is a client system of the group, can supply the group key to a second sub-group as a single-purpose key. As a result, the potential for malicious use of the group key is restricted. The target node, that is, the respective local client system, or another intermediate node which is ranked higher than the respective local client system, can perform the additional steps for the derivation of the first-order sub-group key and, if appropriate, of higher-order sub-keys, itself. As a result, it is possible, in particular, to supply single-purpose keys to exposed field devices as examples of local client systems in a flexible way.

In particular, the group key and the sub-group keys derived from the group key are cryptographic keys. In this case the derived sub-group key is used to cryptographically protect a publish-subscribe message. This cryptographic protection of the publish-subscribe message or message comprises, in particular, integrity protection, authenticity and/or confidentiality.

The following example can be used to illustrate the functionality of the present approach. For example, namespaces can be used as topics to set up the group communication accordingly for a specific topic. An example of this is a virtual power plant (VPP) in the Munich region, which has a separate group for the communication of infeed reductions (reduce infeeds):
VPP.munich.reduce_infeed In this case, a three-step approach can be implemented. For each additional nesting depth another sub-group key is used. For this approach, the following two example implementation options can be used:

1. The allocation to a sub-group requires the corresponding sub-group key, which can be derived locally by each client system of the sub-group according to a predefined rule. The predefined rule is formed, for example, by a key derivation function or a key derivation operation. In doing so a shared secret is bound only to the group key of the group, hence the highest hierarchical level. All other keys, the sub-group keys, can be derived using the topic from the group key, also designated as the primary key.

In the following example $K_{VPP}$ designates the group key, h the key derivation function, group-secret the secret of the group, "additional parameters" other derivation parameters, munich designates the first-order sub-group of the group VPP and reduce_infeed designates the second-order sub-group of the first-order subgroup munich.

$K_{VPP}$=h(group-secret, additional parameters)

$K_{munich}$=h($K_{VPP}$, additional parameters)

$K_{reduce\_infeed}$=h($K_{munich}$, additional parameters)

The sub-grouping increases the direct recognition of the allocation to a communication group. The designated purpose of a derived key is restricted to an expected field of application in accordance with the topic being used. The designated purpose is defined by the derivation parameters comprising the topic.

2. The allocation to each hierarchical level requires a corresponding additional secret, in the example below group-secret$_{munich}$ for the first-order sub-group munich and group-secret$_{reduce\_infeed}$ for the second-order sub-group reduce_infeed, which is formed from a subset of the first-order sub-group munich.

$K_{VPP}$=h(group-secret$_{VPP}$, additional parameters)

$K_{munich}$=h(group-secret$_{munich}$, $K_{VPP}$, additional parameters)

$K_{reduce\_infeed}$=h(group-secret$_{reduce\_infeed}$, $K_{munich}$, additional parameters)

The distribution of the additional sub-group secrets group-secret$_{munich}$ and group-secret$_{reduce\_infeed}$ can be carried out via the key distribution server. The derivation ensures that a single sub-group key is not sufficient to verify or to generate a message. It is thus possible, in particular, to ensure that an infeed reduction reduce_infeed can only occur in a specific area and this is also ensured by the key $K_{reduce\_infeed}$ that is used.

Furthermore, the key derivation can also take direction-dependent parameters as input (publish, subscribe). This allows separate keys to be implemented for the publish communication and for the subscribe communication. Using the specific keys, it is then also advantageously possible to implement a security policy for the allowed communication.

According to one embodiment, the steps a), b) and c) are carried out after a respective authentication of the client system of the group on the key distribution server.

Advantageously, the group key is only distributed to the local client systems after these have been authenticated and authorized by the key distribution server.

According to a further embodiment, the method comprises the following steps:

locally deriving a second-order sub-group key for a second-order sub-group of the first-order sub-group by means of the derived first-order sub-group key by the respective client system of the second-order sub-group, and transferring at least one message cryptographically protected by means of the derived second-order sub-group key between the client systems of the second-order sub-group.

By using the second-order subgroup and the corresponding second-order sub-group keys, a further hierarchical level can be created below the group and the first-order sub-group. Thus, the messages in the publish-subscribe system can be distributed in a more differentiated way.

According to a further embodiment, the first-order sub-group key for the first-order sub-group is derived by means of the key derivation parameters comprising the provided group key, the specific topic of the publish-subscribe system, a secret specific to the first-order sub-group, and at least one other derivation parameter.

Through the use of a specific secret, which is specific to the sub-group, it is possible to ensure that a single sub-group key is not sufficient to verify or to generate a message.

According to a further embodiment the additional derivation parameter is a parameter based on the publish-subscribe system.

According to a further embodiment the additional derivation parameter is indicative of a communication direction within the publish-subscribe system, of a key usage within the publish-subscribe system and/or of a validity period for the first-order sub-group key.

As already explained above, direction-related derivation parameters or parameters can also be input into the key derivation. This makes it possible, for example, to implement separate publish communications and subscribe communications.

In addition it is possible to use a role or a security label of a mandatory access control system as a derivation parameter. Each topic is assigned a role or a label. A domain type can be assigned to the data, whereas a role type is assigned, for example, to a local client system. In addition, a security label of a topic can be used in addition to the topic, or instead of the topic, as a derivation parameter. This can be implemented as an indirection, in which the topic is first mapped onto a label and the label is used as a derivation parameter for the derivation function.

According to a further embodiment, the first-order sub-group key for the first-order sub-group is derived by means of a commutative operation from the key derivation parameters by the respective client system of the first-order sub-group.

According to a further embodiment, M subgroups of the group of client systems ranked in a hierarchy are provided. In this case, a subgroup key of (N+1)-th order of a sub-group of (N+1)-th-order is derived by means of an Nth-order sub-group key of an Nth-order sub-group.

The operation is, in particular, a key derivation function. The commutative key derivation function is a key derivation, in which a plurality of key derivation parameters are input, which can be applied iteratively. In the case of a commutative key derivation function, the derivation steps of the different derivation parameters are interchangeable, that is to say the following is true:

$KDF(KDF(K, P1), P2)=KDF(KDF(K, P2), P1)$, where KDF designates the key derivation function, K the group key, P1 a first parameter and P2 a second parameter.

According to a further embodiment the Nth-order sub-group in the hierarchy of the M ranked sub-groups is arranged directly above the sub-group of (N+1)-th order.

According to a further embodiment, the method comprises the following steps:

locally deriving a sub-group key of (N+1)-th order for a sub-group of (N+1)-th order of the Nth-order subgroup by means of the derived Nth-order sub-group key by the respective client system of the subgroup of (N+1)-th order, with $N \in [1, \ldots, M]$ and $M>2$, and transferring at least one message cryptographically protected by means of the derived sub-group key of (N+1)-th order between the client systems of the sub-group of (N+1)-th order.

These steps can be carried out iteratively for all sub-groups, so that for each sub-group the corresponding sub-group key can be provided on each client system of the respective sub-group.

According to a further embodiment, the sub-group key of (N+1)-th order for the sub-group of (N+1)-th order is derived using the derived N-th order sub-group key and using a specific secret for the sub-group of (N+1)-th order by the respective client system of the sub-group of (N+1)-th order.

The specific secret cryptographically protects the respective sub-group even better.

According to a further embodiment the local client system comprises a number of client devices. The respective client device is, in particular, a decentralized power generation facility for supplying electrical power into a power supply network.

According to a further embodiment, the client system has a key derivation unit, by means of which the sub-group key is derived for the client devices of the client system.

According to a further embodiment, the client system is allocated to a particular sub-group of M sub-groups ranked in a hierarchy for the group of client systems, wherein the sub-group key for the client devices of the client system allocated to the specific sub-group is derived by means of the key derivation unit of the client system.

The following example based on a publish-subscribe system for feeding electrical power into a local power supply grid can illustrate the functionality of the present approach. The publish-subscribe system comprises a key distribution server which is connected to a number of local client systems, for example via the internet or an intranet. The local client systems can comprise local energy producers, local energy consumers and control components, such as virtual operators, to control the energy infeed and the energy distribution.

The communication protocol used in the publish-subscribe system can be, for example, XMPP. In the present case, the key distribution server can also be designated as an XMPP server and implements some of the address resolution, to make producers and consumers visible and accessible to the control components. Furthermore, a multi-user chatroom set up on the XMPP server enables a group communication, so that a control component can send, for example a load shedding command or a reduction of the infeed, to all logged-in members of the group.

In accordance with the IEC61350-8-2 standard, all XMPP clients can log on to the XMPP server via a TLS-protected link and can use a locally existing certificate and the corresponding private key to authenticate themselves. In addition, an authentication can be carried out on a multi-user chatroom of the XMPP server in order to obtain access for the correspondingly authorized chatrooms. In accordance with the possible different groups, different chatrooms can be set up, depending on specific local expanses, for example. The different chatrooms can be set up, for example, for the first-order sub-groups and for the second-order sub-groups.

According to a second aspect, a computer program product (non-transitory computer readable storage medium having instructions, which when executed by a processor, perform actions) is proposed, which on a program-controlled device causes the implementation of the method as described above according to the first aspect or one of the embodiments of the first aspect.

A computer program product, such as a computer program means, can be provided or supplied as a storage medium, such as a memory card, USB stick, CD-ROM, DVD, or else in the form of a downloadable file from a server to a network. This may be effected, for example, in a wireless communication network by the transmission of a corresponding file with the computer program product or the computer program means.

According to a third aspect, a device for transferring data in a topic-based publish-subscribe system is proposed, comprising a key distribution server and a number of local client systems that can be coupled to the key distribution server. The device comprises a first unit, a second unit and a third unit. The first unit is configured for providing a group key by the key distribution server for a group selected from among the local client systems. The second unit is configured for deriving a first-order sub-group key for a first-order sub-group of the group by the respective client system of the first-order sub-group by means of key derivation parameters, at least comprising the provided group key and a specific topic of the publish-subscribe system. The third unit is configured for transferring at least one message cryptographically protected by means of the derived first-order sub-group key between the client systems of the first-order sub-group.

The embodiments and features described for the proposed method apply correspondingly to the proposed device.

The particular unit, for example the first unit, can be implemented in hardware and/or software technologies. In the case of a hardware-based implementation, the respective unit can be implemented as a device or as part of a device, for example as a computer or as a microprocessor or as an integrated circuit. In the case of a software-based implementation, the respective unit can be implemented as a computer program product, as a function, as a routine, as part of a program code or as an executable object.

According to a fourth aspect, a topic-based publish-subscribe system is proposed. The publish-subscribe system comprises a key distribution server, a number of local client systems that can be coupled to the key distribution server, and at least one device according to the fourth aspect for transferring data in the topic-based publish-subscribe system.

Further possible implementations of embodiments of the invention also comprise combinations of features or embodiments either described previously or in the following in relation to the exemplary embodiments, which are not explicitly mentioned. A person skilled in the art will also be able to add individual aspects as improvements or additions to each basic form of embodiments of the invention.

BRIEF DESCRIPTION

Some of the embodiments will be described in detail, with reference to the following figures, wherein like designations denote like members, wherein.

In the figures, the same or functionally equivalent elements have been provided with the same reference numerals, unless otherwise indicated.

DETAILED DESCRIPTION

Figure 1:
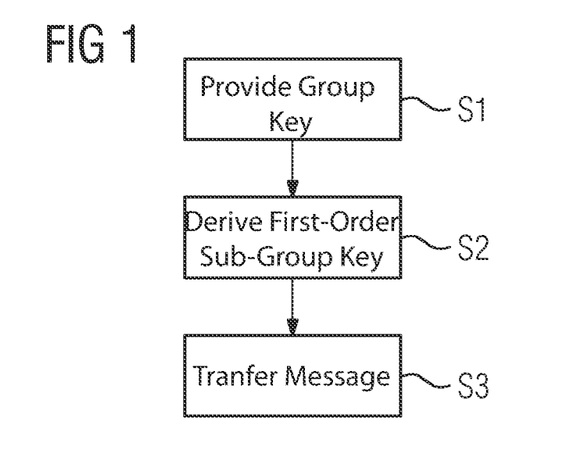
FIG. 1 shows a schematic flow diagram of a first exemplary embodiment of a method for transferring data in a topic-based publish-subscribe system.

FIG. 1 shows a schematic flow diagram of a first exemplary embodiment of a method for transferring data in a topic-based publish-subscribe system 100.

The publish-subscribe system 100 comprises a key distribution server 200 and a number of local client systems 310, 320 that can be coupled with the key distribution server 200.

Figure 2:
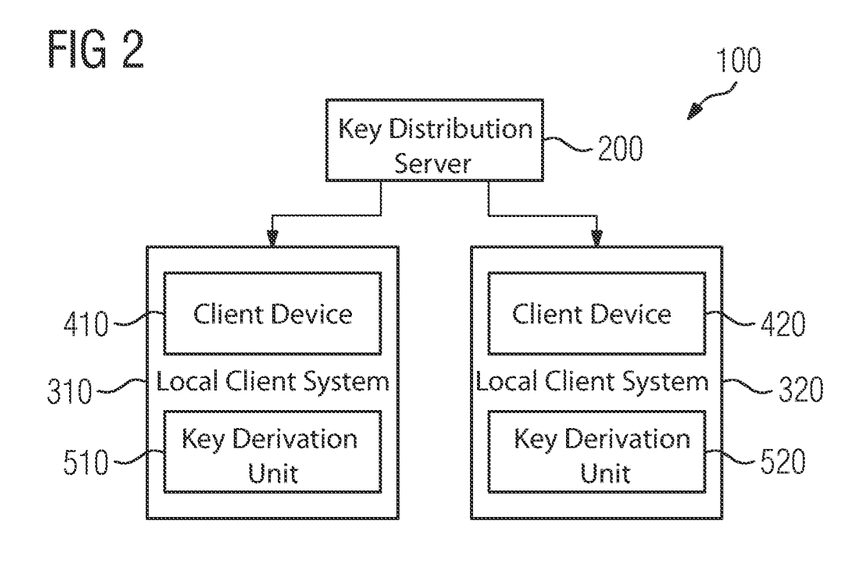
FIG. 2 shows a schematic block circuit diagram of an exemplary embodiment of a publish-subscribe system.

FIG. 2 shows a schematic block circuit diagram of an exemplary embodiment of such a publish-subscribe system 100. Without loss of generality, the publish-subscribe system 100 of FIG. 2 has two local client systems 310 and 320. The number of the client systems is arbitrary. For example, the publish-subscribe system 100 can comprise a few hundred or a few thousand client systems.

The respective client system 310, 320 of FIG. 2 comprises a respective client device 410, 420 and a respective key derivation unit 510, 520. In particular, the key derivation unit 510, 520 in the respective local client system 310, 320 is ranked higher than the respective client device 410, 420, that is, it is arranged between the respective client device 410, 420 and the key distribution server 200. One advantage of this arrangement of the key derivation unit 510, 520 before the respective client device 410, 420 is the fact that the respective client system 310, 320 can have a multiplicity of respective client devices. In such a case, the respective key derivation unit 510, 520 can be used for a multiplicity of client devices of the respective client system 310, 320.

The method of FIG. 1 comprises the following steps S1, S2 and S3:

In step S1, a group key is provided by the key distribution server 200 for a group G selected from the local client systems 310, 320. As already stated above, the publish-subscribe system 200 comprises, for example, a multiplicity, for example, several hundred or thousand client systems. Accordingly, the publish-subscribe system 100 can comprise a number of different groups G, wherein the respective group G is assigned to a topic of the publish-subscribe system 100.

In step S2, a first-order sub-group key for a first-order sub-group UG1 of the group G is locally derived by means of key derivation parameters, at least comprising the supplied group key and a specific topic of the publish-subscribe system 100, by the respective client system 310, 320 of the first-order sub-group UG1. In a simple example, the client systems 310, 320 are part of a first-order sub-group UG1 of the group G. The group G can comprise further client systems, not shown in detail, in addition to the client systems 310, 320.

Figure 3:
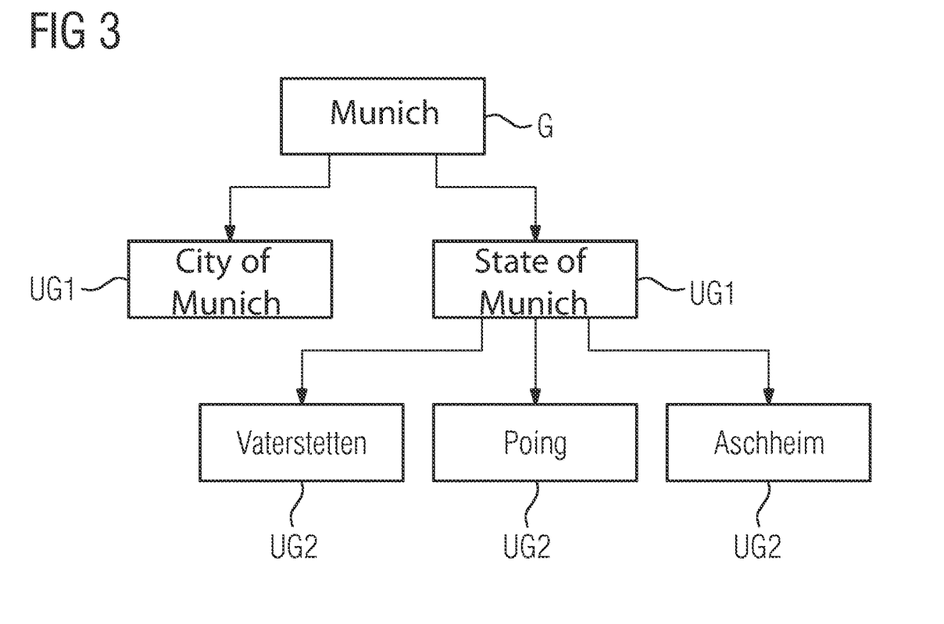
FIG. 3 shows a schematic view of different groups of local client systems of a publish-subscribe system.

For a better understanding of the group G and the sub-group UG1 or sub-groups UG1, FIG. 3 shows a schematic view of different groups of local client systems of a publish-subscribe system 100. Both sub-groups UG1 shown in FIG. 3 are subsets of the group G of client systems. In particular, although the left first-order sub-group UG1 and the right first-order sub-group UG1 are subsets of the group G, in general however, they are not disjoint subsets of the group G.

FIG. 3 also shows that the respective first-order sub-group, as in the example of FIG. 3 the first-order sub-group UG1 on the right-hand side, can have additional sub-groups, then so-called second-order sub-groups UG2. The three second-order sub-groups UG2 shown in FIG. 3 of the first-order sub-group UG1, in turn, correspond to subsets of the client systems of the first-order sub-group UG1. Although the three second-order sub-groups UG2 shown in FIG. 3 are subsets of the first-order sub-group UG1, in general they are not disjoint subsets of the first-order sub-group UG1.

For example, the group G comprises all power production facilities in Munich for generating electrical power in the local power supply grid. Examples of such power generation facilities include power plants, but also local energy producers for supplying solar power.

If the group G comprises all energy production facilities in Munich then, for example, the left first-order sub-group UG1 of FIG. 3 can comprise the power production facilities from the city of Munich as client systems, whereas the right-hand first-order sub-group UG1 of FIG. 3 comprises the power production facilities of the State of Munich as client systems.

Any of the first-order sub-groups UG1 can, in turn, comprise a plurality of second-order sub-groups UG2. In the example of FIG. 3 the right-hand first-order sub-group (Munich State), for example, three second-order sub-groups UG2, for example the second-order sub-group for the power generation facilities in Vaterstetten (left), the power generation facilities for Poing (center) and the power generation facilities for Aschheim (right). These listings are purely examples and are not exhaustive.

Figure 4:
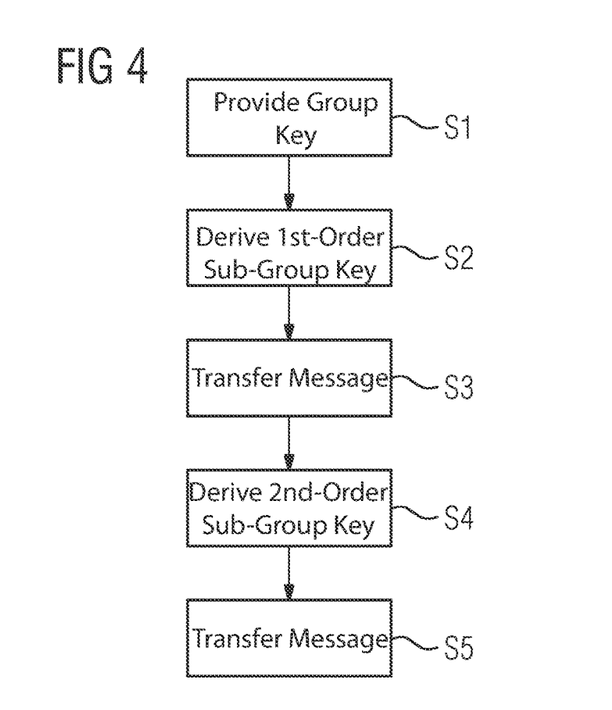
FIG. 4 shows a schematic flow diagram of a second exemplary embodiment of a method for transferring data in a topic-based publish-subscribe system.

FIG. 4 also shows a schematic flow diagram of a second exemplary embodiment of a method for transferring data in a topic-based publish-subscribe system 100.

The second exemplary embodiment of FIG. 4 is based on the first exemplary embodiment of FIG. 1 and in addition to the steps S1-S3 outlined already with reference to FIG. 1, comprises the steps S4 and S5.

In step S4 a second-order sub-group key for a second-order sub-group UG2 of the first-order sub-group UG1 (see also FIG. 3) is derived by means of the derived first-order sub-group key by the respective client system of the second-order sub-group UG2. In relation to this, FIG. 3 shows three different second-order sub-groups UG2, in which the respective second-order sub-group UG2 of FIG. 3 comprises a subset of client systems of the first-order sub-group UG1 shown on the right in FIG. 3.

In step S5 at least one message cryptographically protected by means of the derived second-order sub-group key is transferred between the client systems of the second-order sub-group UG2.

In particular, the first-order sub-group key for the first-order sub-group UG1 is derived by means of the key derivation parameters comprising the supplied group key, the specific topic of the publish-subscribe system 100, a secret specific to the first-order sub-group UG1 and at least one other derivation parameter.

The additional derivation parameter is, in particular, a parameter based on the publish-subscribe system. The publish-subscribe-system-based parameter is indicative, for example, of a communication direction within the publish-subscribe system 100, a key usage within the publish-subscribe subscribe system 100, or of a validity period for the first-order sub-group key. In particular, the first-order sub-group key for the first-order sub-group UG1 is derived by means of a commutative operation from the key derivation parameters by the respective client system of the first-order sub-group UG1.

As FIG. 3 shows, the subgroups UG1 and UG2 are arranged in a hierarchy. If N denotes the hierarchical level in the hierarchy of the groups, then the following is obtained for the example of FIG. 3:

N=0: group G, top-most hierarchical level
N=1: first-order sub-group UG1, second hierarchical level
N=2: second-order sub-group UG2, lowest hierarchical level The derivation of the sub-group keys can therefore be formulated in general as follows: a sub-group key of (N+1)-th order of a sub-group of (N+1)-th order is derived by means of a sub-group key of Nth order of a sub-group of Nth order. For the example of the second-order sub-group UG2, the second-order sub-group key is derived using the first-order sub-group key of the first-order sub-group UG1. The subgroup of Nth order in the hierarchy is positioned directly above the subgroup of (N+1)-th order.

Figures 5, 6:
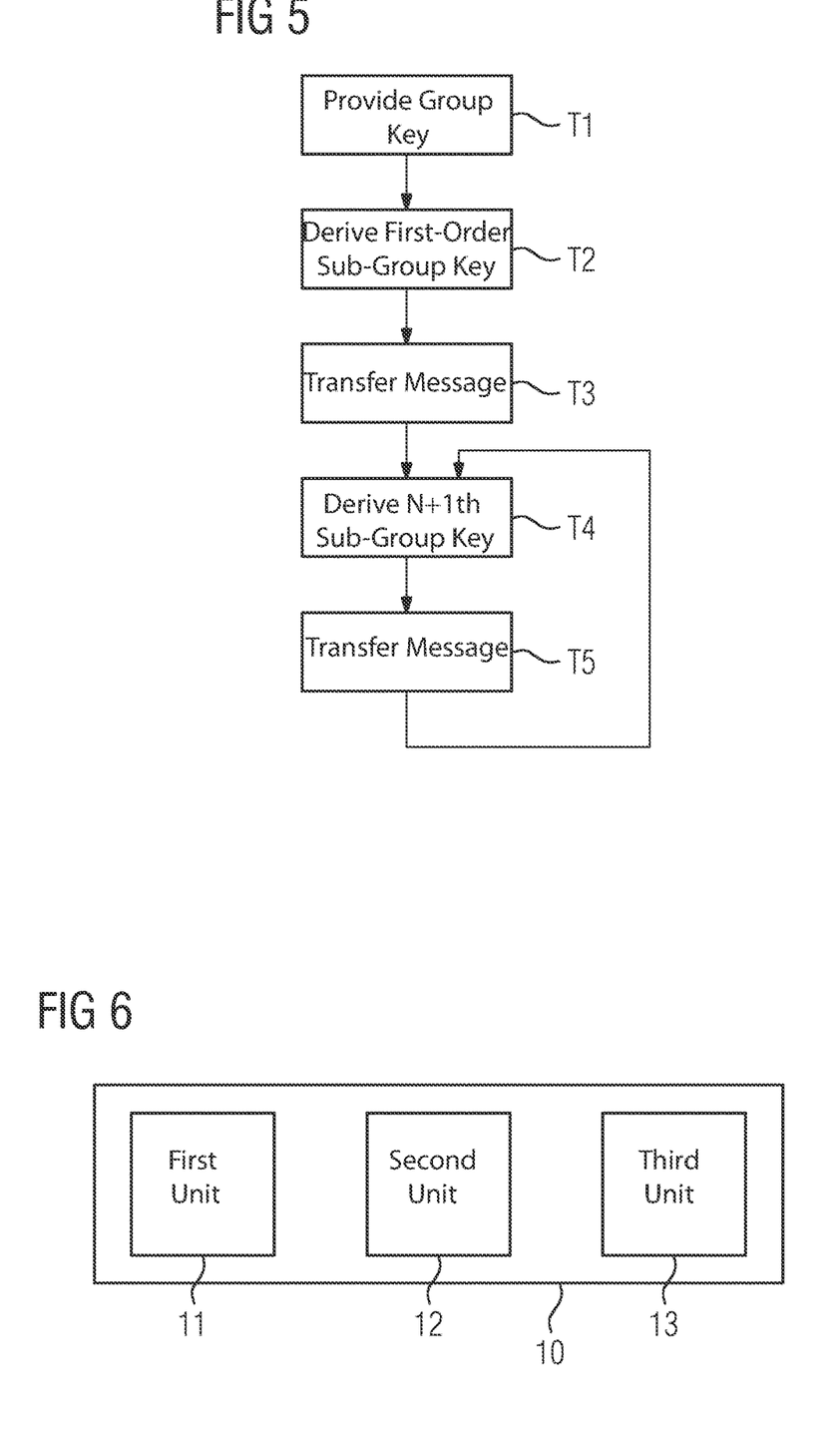
FIG. 5 shows a schematic flow diagram of a third exemplary embodiment of a method for transferring data in a topic-based publish-subscribe system.
FIG. 6 shows a schematic block circuit diagram of an exemplary embodiment of a device for transferring data in a topic-based publish-subscribe system.

FIG. 5 shows a schematic flow diagram of a third exemplary embodiment of a method for transferring data in a topic-based publish-subscribe system 100.

The third exemplary embodiment of FIG. 5 comprises the steps T1-T5:
the steps T1-T3 correspond to the steps S1-S3 already outlined in relation to FIG. 1.

In step T4 a sub-group key of (N+1)-th order for a sub-group of (N+1)-th order of the Nth-order sub-group is locally derived by means of the derived Nth-order sub-group key by the respective client system of the subgroup of (N+1)-th order, with N∈[1, . . . , M] and M>2.

In step T5 at least one message cryptographically protected by means of the derived sub-group key of (N+1)-th order is transferred between the client systems of the sub-group of (N+1)-th order.

The steps T4 and T5 are carried out iteratively for each of the M sub-groups.

In particular, the sub-group key of (N+1)-th order for the sub-group of (N+1)-th order is derived by the respective client system of the sub-group of (N+1)-th order using the derived Nth-order sub-group key and using a specific secret for the sub-group of (N+1)-th order.

FIG. 6 shows a schematic block circuit diagram of an exemplary embodiment of a device 10 for transferring data in a topic-based publish-subscribe system 100.

The publish-subscribe system 100 comprises at least one key distribution server 200 and a number of local client systems 310, 320 that can be coupled with the key distribution server 200. An example of such a publish-subscribe system 100 is shown in FIG. 2.

The device 10 comprises a first unit 11, a second unit 12 and a third unit 13.

The first unit 11 unit is configured to provide a group key by means of the key distribution server 200 for a group G selected from the local client systems 310, 320.

The second unit 12 is configured to derive a first-order sub-group key for a first-order sub-group UG1 of the group G by means of key derivation parameters, at least comprising the supplied group key and a specific topic of the publish-subscribe system 100 for the respective client system 310, 320 of the first-order sub-group UG1.

The first unit 11 is assigned to the key distribution server 200, whereas the second unit 12 is assigned locally to the client system 310, 320. The number of second units 12 provided is equal to the number of client systems 310, 320 of the first-order sub-group UG1.

The third unit 13 is configured to transfer at least one message cryptographically protected by means of the derived first-order sub-group key between the client systems 310, 320 of the first-order sub-group UG1.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for transferring data in a topic-based publish-subscribe system, comprising a key distribution server and a number of local client systems that is coupled with the key distribution server, comprising:

a) providing a group key by the key distribution server for a group selected from the local client systems,
b) locally deriving a first-order sub-group key for a first-order sub-group of the group by means of key derivation parameters, at least comprising the provided group key and a specific topic of the publish-subscribe system, by the respective client system of the first-order sub-group, c) transferring at least one message cryptographically protected by the derived first-order sub-group key between the client systems of the first-order sub-group,
d) locally deriving a second-order sub-group key for a second-order sub-group of the first-order sub-group by means of the derived first-order sub-group key by the respective client system of the second-order sub-group, and
e) transferring at least one message cryptographically protected by the derived second-order sub-group key between the client systems of the second-order sub-group.

2. The method as claimed in claim 1,
wherein
the steps a), b) and c) are carried out after a respective authentication of the client system of the group on the key distribution server.

3. The method as claimed in claim 1,
wherein
the first-order sub-group key for the first-order sub-group is derived by the key derivation parameters comprising the supplied group key, the specific topic of the publish-subscribe system, a secret specific to the first-order sub-group and at least one additional derivation parameter.

4. The method as claimed in claim 3,
wherein
the additional derivation parameter is a publish-subscribe-system-based parameter, which is indicative of a communication direction within the publish-subscribe system, a key usage within at least one of the publish-subscribe system and a validity period of the first-order sub-group key.

5. The method as claimed in claim 1,
wherein
the first-order sub-group key for the first-order sub-group is derived by a commutative operation from the key derivation parameters by the respective client system of the first-order sub-group.

6. The method as claimed in claim 1,
wherein
M sub-groups ranked in a hierarchy of the group of client systems are provided, wherein a sub-group key of (N+1)-th order of a sub-group of (N+1)-th order is derived by an Nth order sub-group key of an Nth order sub-group.

7. The method as claimed in claim 6,
wherein
the Nth order sub-group in the hierarchy of the M ranked sub-groups is arranged directly above the sub-group of (N+1)-th order.

8. The method as claimed in claim 1,
wherein
locally deriving a sub-group key of (N+1)-th order for a sub-group of (N+1)-th order of the subgroup of Nth order by means of the derived Nth order sub-group key by the respective client system of the subgroup of (N+1)-th order, with $N \in [1, \ldots, M]$ and $M > 2$, and
transferring at least one message cryptographically protected by the derived sub-group key of (N+1)-th order between the client systems of the sub-group of (N+1)-th order.

9. The method as claimed in claim 8,
wherein
the sub-group key of (N+1)-th order for the sub-group of (N+1)-th order is derived using the derived Nth order sub-group key and a specific secret for the sub-group of (N+1)-th order by the respective client system of the sub-group of (N+1)-th order.

10. The method as claimed in claim 1,
wherein
the local client system comprises a number of client devices, wherein the client device comprises a decentralized power generation facility for the supply of electrical power into a power supply network.

11. The method as claimed in claim 10,
wherein
the local client system has a key derivation unit, by means of which the sub-group key for the client devices of the local client system is derived.

12. The method as claimed in claim 11,
wherein
the client system is allocated to a particular sub-group of M sub-groups ranked in a hierarchy for the group of client systems, wherein the sub-group key for the client devices of the client system allocated to the specific sub-group is derived by means of the key derivation unit of the client system.

13. A device for transferring data in a topic-based publish-subscribe system, comprising a key distribution server and a number of local client systems that is coupled with the key distribution server, comprising:
a first unit for providing a group key by the key distribution server for a group selected from the local client systems,
a second unit for deriving a first-order sub-group key for a first-order sub-group of the group by means of key derivation parameters, at least comprising the provided group key and a specific topic of the publish-subscribe system for the respective client system of the first-order sub-group, and
a third unit for transferring at least one message cryptographically protected by means of the derived first-order sub-group key between the client systems of the first-order sub-group,
wherein the device is configured to locally derive a second-order sub-group key for a second-order sub-group of the first-order sub-group by means of the derived first-order sub-group key by the respective client system of the second-order sub-group and transfer at least one message cryptographically protected by the derived second-order sub-group key between the client systems of the second-order sub-group.

14. A publish-subscribe system comprising:
a key distribution server, a number of local client systems that is coupled with the key distribution server, and at least one device for transferring data in the topic-based publish-subscribe system, wherein the at least one device includes a first unit for providing a group key by the key distribution server for a group selected from the local client systems, a second unit for deriving a first-order sub-group key for a first-order sub-group of the group by means of key derivation parameters, at least comprising the provided group key and a specific topic of the publish-subscribe system for the respective client system of the first-order sub-group, and a third unit for transferring at least one message cryptographically protected by means of the derived first-order sub-group key between the client systems of the first-order sub-group,
wherein the publish-subscribe system is also configured to locally derive a second-order sub-group key for a second-order sub-group of the first-order sub-group by means of the derived first-order sub-group key by the respective client system of the second-order sub-group and transfer at least one message cryptographically protected by the derived second-order sub-group key between the client systems of the second-order sub-group.

* * * * *